(12) United States Patent
Goto et al.

(10) Patent No.: US 7,160,839 B2
(45) Date of Patent: Jan. 9, 2007

(54) CATALYST FOR PURIFYING NITROGEN OXIDES

(75) Inventors: Hideki Goto, Frankfurt am Main (DE); Shigeyoshi Taniguchi, Himeji (JP); Makoto Horiuchi, Himeji (JP)

(73) Assignees: ICT Co., Ltd., Osaka (JP); International Catalyst Technology, Inc., Auburn Hills, MI (US)

( * ) Notice: Subject to any disclaimer, the term of this patent is extended or adjusted under 35 U.S.C. 154(b) by 104 days.

(21) Appl. No.: 10/220,914

(22) PCT Filed: Jan. 10, 2002

(86) PCT No.: PCT/JP02/00076

§ 371 (c)(1),
(2), (4) Date: Dec. 9, 2002

(87) PCT Pub. No.: WO02/055194

PCT Pub. Date: Jul. 18, 2002

(65) Prior Publication Data

US 2003/0144144 A1     Jul. 31, 2003

(30) Foreign Application Priority Data

Jan. 11, 2001 (JP) .............................. 2001-003658
Jan. 11, 2001 (JP) .............................. 2001-003659

(51) Int. Cl.
*B01J 21/00* (2006.01)
*B01J 23/00* (2006.01)
*B01J 23/10* (2006.01)
*B01J 23/56* (2006.01)

(52) U.S. Cl. .................. 502/325; 502/352; 502/261; 502/302; 502/304; 502/332; 502/355

(58) Field of Classification Search ................ 502/325, 502/349, 352, 263, 302, 304, 332, 355, 261
See application file for complete search history.

(56) References Cited

U.S. PATENT DOCUMENTS

| | | | |
|---|---|---|---|
| 3,821,105 A * | 6/1974 | Mitsche et al. | 208/139 |
| 3,900,386 A * | 8/1975 | Hayes | 208/111.1 |
| 3,939,220 A * | 2/1976 | Rausch | 585/379 |
| 4,003,852 A * | 1/1977 | Hayes | 502/330 |
| 4,536,375 A * | 8/1985 | Holt et al. | 423/247 |
| 5,306,684 A * | 4/1994 | Itoh et al. | 502/61 |
| 5,413,976 A * | 5/1995 | Takami et al. | 502/66 |
| 5,849,255 A * | 12/1998 | Sawyer et al. | 423/213.5 |
| 6,214,307 B1 * | 4/2001 | Okumura et al. | 423/213.5 |
| 2001/0012502 A1 * | 8/2001 | Okumura et al. | 423/213.5 |

FOREIGN PATENT DOCUMENTS

| | | |
|---|---|---|
| EP | 832688 A1 | 4/1998 |
| JP | B-56-054173 | 12/1981 |
| JP | B-57-013328 | 3/1982 |
| JP | A-06-031173 | 2/1994 |
| JP | 2618316 | 4/1994 |
| JP | A-06-99068 | 4/1994 |
| JP | A-06-096870 | 10/1994 |
| JP | A-06-327980 | 11/1994 |
| JP | A-07-031884 | 2/1995 |
| JP | A-07-68177 | 3/1995 |
| JP | A-07-080315 | 3/1995 |
| JP | A-07-088378 | 4/1995 |
| JP | A-07-246337 | 9/1995 |
| JP | A-08-033845 | 2/1996 |
| JP | A-08-071422 | 3/1996 |
| JP | A-10-094730 | 4/1998 |
| JP | A-11-165072 | 6/1999 |
| JP | A-2000-300993 | 10/2000 |

OTHER PUBLICATIONS

Full English translation of JP-A-06-327980, published Nov. 29, 1994.*

* cited by examiner

*Primary Examiner*—Colleen P. Cooke
(74) *Attorney, Agent, or Firm*—Mathews, Shepherd, McKay & Bruneau, P.A.

(57) ABSTRACT

A catalyst for purifying NOx is provided which efficiently decomposes and purify the NOx in an exhaust gas in an oxygen-excess atmosphere, excels in resistance to heat and in durability in a high temperature range under a high-temperature oxidizing atmosphere and in the presence of moisture and SOx, and manifests the catalytic activity over a wide range of temperature. It is a catalyst for purifying nitrogen oxides formed by coating (A) a catalytically active component comprising (A-a) iridium and (A-b) at least one element selected from the group consisting of the elements of Group IIIA and Group IVA in the Periodic Table of the Elements with (B) a refractory inorganic compound.

9 Claims, No Drawings

CATALYST FOR PURIFYING NITROGEN OXIDES

TECHNICAL FIELD

This invention relates to a catalyst for purifying nitrogen oxides and used for decreasing the nitrogen oxides contained in the exhaust gas emanating from the internal combustion engine of an automobile, a boiler, an industrial plant, etc.

BACKGROUND ART

The nitrogen oxides (hereinafter referred to as "NOx") contained in the exhaust gas emanating from aninternal combustion engine of an automobile, a boiler, an industrial plant, etc. form the cause for air pollution and acid precipitation. It is urgently necessary for the exhaust gas to be purged of the NOx.

In the case of the exhaust gas from the gasoline engine of an automobile, for example, a method has been heretofore known which comprises treating the exhaust gas with the so-called three-way catalyst using platinum, for example, and consequently purging this exhaust gas of not only hydrocarbons (hereinafter referred to as "HC") and carbon monoxide (hereinafter referred to as "CO") but also NOx. This method is unusually effective where the air-fuel ratio (hereinafter referred to as "A/F") falls in the proximity of the stoichiometry (A/F=14.7).

In recent years, however, the development of the lean-burn engine has been under way with a view to minimizing the fuel cost and curtailing the amount of carbon dioxide to be discharged. The engine of this kind, however, does not permit easy expulsion of the NOx with an ordinary three-way catalyst because it has an increased A/F (hereinafter referred to as "oxygen-excess atmosphere") and the exhaust gas has an oxygen concentration exceeding the amount of oxygen necessary for perfect combustion of such unburned components as HC and CO.

In contrast, in the case of the diesel engine, the exhaust gas constitutes an oxygen-excess atmosphere. For the exhaust gas from such a fixed source of generation as a boiler, it is known to purge the exhaust gas of the NOx by a method of using such a reducing agent as ammonia, hydrogen, or carbon monoxide.

These methods, however, necessitate a separate device to be used for the addition of the reducing agent and a special device for recovering and treating the unaltered portion of the reducing agent and, consequently, entail complication and expansion of the system as a whole. The reducing agent such as ammonia, hydrogen, or carbon monoxide which is highly toxic and hazardous cannot be easily mounted in such a source for generation of motion as an automobile and can be applied thereto only with difficulty by reason of safety.

Recently, with a view to avoiding the problems mentioned above, various catalysts having iridium as the catalytically active species have been suggested for the catalysis of the expulsion of the NOx from an oxygen-excess atmosphere and have been partly utilized to practice.

The exhaust gas from the lean-burn engine is not always in an oxygen-excess atmosphere but is caused to assume a various atmosphere by the driving condition of the relevant automobile. Under the working environment of this nature, the catalyst which has iridium as the catalytically active species is liable to be degraded by an elevated temperature. Particularly, under the condition of exposing the surface of the catalyst to a high-temperature oxidizing atmosphere as when the automobile during driving at a high speed is decelerated so much as to entail a cut in the fuel, the fact that the degradation of the catalyst rapidly proceeds poses a problem.

As typical examples of the catalyst having iridium as the catalytically active species, catalysts having iridium deposited on such a refractory inorganic oxide as alumina (JP-B-56-54173, JP-B-57-13328, Japanese Patent No. 2618316, and JP-A-10-94730), catalysts having iridium deposited on support material of such substances as zeolite and crystalline silicate (JP-A-6-296870, JP-A-7-80315, and JP-A-7-88378), and catalysts having iridium deposited on support material of such substances as metallic carbides and metallic nitrides (JP-A-6-31173, JP-7-31884, JP-A-7-246337, JP-A-8-33845, and JP-A-8-71422) may be cited.

The working examples reported in these official gazettes, however, pay no consideration to the problem mentioned above. None of them depicts the test of a catalyst for durability under a high-temperature oxidizing atmosphere.

The desirability of developing a NOx expelling catalyst which efficiently decomposes and expels the NOx from the exhaust gas in an oxygen-excess atmosphere, excels in resistance to heat and in durability under a high-temperature oxidizing atmosphere, and in the presence of moisture and SOx, and moreover manifests a catalytic activity in a wide range of temperature has been finding enthusiastic recognition.

DISCLOSURE OF INVENTION

The object of this invention implied above is accomplished by the following items (1) to (23).

(1) A catalyst for purifying nitrogen oxides formed by coating (A) a catalytically active substance comprising (A-a) iridium and (A-b) at least one element selected from the group consisting of the elements of Group IIIA and Group IVA in the Periodic Table of the Elements with (B) a refractory inorganic compound.

(2) A catalyst for purifying nitrogen oxides set forth in the item (1) above, wherein said catalyst is supported on a refractory inorganic substrate.

(3) A catalyst for purifying nitrogen oxides set forth in the item (2) above, wherein said refractory inorganic substrate is coated with a layer which contains a catalytically active substance comprising iridium (A-a) and said element (A-b), and said layer is coated with a layer which contains the refractory inorganic compound (B).

(4) A catalyst for purifying nitrogen oxides set forth in the item (1) above, wherein the element (A-b) is an element in the Group IVA.

(5) A catalyst for purifying nitrogen oxides set forth in the anyone of items (1) to (4) above, wherein the refractory inorganic compound (B) is at least one compound selected from the group consisting of (B-a) a compound containing at least one member selected from the group consisting of aluminum, titanium, zirconium, and silicon, (B-b) composite oxides thereof, (B-c) zeolite, and (B-d) barium sulfate.

(6) A catalyst for purifying nitrogen oxides set forth in the item (4) above, wherein the element in Group IVA is tin and/or germanium.

(7) A catalyst for purifying nitrogen oxides set forth in any one of the items (1) to (6) above, wherein said refractory inorganic compound (B) is zeolite and/or barium sulfate.

(8) A catalyst for purifying nitrogen oxides set forth in any one of the items (1) to (7) above, wherein a molar ratio of the element of (A-b) to iridium, [(A-b)/Ir], is in the range of 1:5 to 200:1 and the molar ratio of the refractory inorganic compound (B) to iridium, [(B)/Ir], is in the range of 10:1 to 100:1.

(9) A catalyst for purifying nitrogen oxides set forth in any items (1) to (8) above, wherein said catalytically active substance coated with said refractory inorganic compound (B) is further incorporated with a refractory inorganic oxide.

(10) A catalyst for purifying nitrogen oxides set forth in the item (9) above, wherein an amount of said further incorporating refractory inorganic oxide is in the range of 1 to 300 g per g of the catalytically active substance mentioned in any one of the items (1) to (8).

(11) A catalyst for purifying nitrogen oxides set forth in the item (9) above, wherein a content of iridium is in the range of 0.1 to 20% by weight based on the amount of said further incorporating refractory inorganic oxide.

(12) A catalyst for purifying nitrogen oxides set forth in any one of the items (9) to (11) above, said catalyst is deposited in an amount in the range of 50 to 500 g per liter of the refractory inorganic substrate. (13) A catalyst for purifying nitrogen oxides which contains (A) catalytically active substance comprising iridium (A-a) and at least one element selected from the group consisting of the elements of Group IIIA and Group IIA in the Periodic Table of the Elements (A-b) and (C) at least one element selected from the group consisting of the elements of Group IIIB.

(14) A catalyst for purifying nitrogen oxides set forth in the item (13) above, wherein said catalyst is supported by a refractory inorganic substrate.

(15) A catalyst for purifying nitrogen oxides set forth in the item (13) or (14) above, wherein the element (A-b) is an element in Group IVA.

(16) A catalyst for purifying nitrogen oxides set forth in any of the items (13) to (15) above, wherein the element (C) is yttrium and/or an element of the lanthanide series.

(17) A catalyst for purifying nitrogen oxides set forth in the item (15) above, wherein the element of Group IVA is tin and/or germanium.

(18) A catalyst for purifying nitrogen oxides set forth in the items (16) or (17) above, wherein the element of the lanthanide series is cerium.

(19) A catalyst for purifying nitrogen oxides set forth in any one of the items (13) to (18), wherein a molar ratio of the element of (A-b) to iridium, [(A-b)/Ir], is in the range of 1:5 to 200:1 and the molar ratio of the element of (C) to iridium, [(C)/Ir], is in the range of 1:10 to 10:1.

(20) A catalyst for purifying nitrogen oxides set forth in any one of the items (13) to (19) above, wherein said catalytically active substance is further incorporated with a refractory inorganic oxide.

(21) A catalyst for purifying nitrogen oxides set forth in the item (20) above, wherein an amount of said further incorporating refractory inorganic oxide is in the range of 1 to 300 g per g of the catalytically active substance mentioned in any one of the items (13) to (19).

(22) A catalyst for purifying nitrogen oxides set forth in the item (20) above, wherein the content of iridium is in the range of 0.1 to 20% by weight based on the amount of said further incorporating refractory inorganic oxide.

(23) A catalyst for purifying nitrogen oxides having the catalytic composition set forth in any one of the items (20) to (22) above deposited in an amount in the range of 50 to 400 g per liter of the refractory inorganic substrate.

BEST MODE FOR CARRYING OUT THE INVENTION

The first mode of embodiment of this invention will be explained in detail below.

The catalyst for purifying NOx of this invention is formed by coating (A) a catalytically active substance serving to purify the NOx and comprising (A-a) iridium and (A-b) at least one element selected from the elements of Group IIIA and Group IVA in the Periodic Table of the Elements with (B) a refractory inorganic compound. The catalytically active substance mentioned above is preferred to contain further a refractory inorganic oxide. In a preferred embodiment, therefore, this invention uses a catalytic composition which comprises (A) the catalytically active substance (A), and the refractory inorganic oxide. The refractory inorganic compound (B) and the refractory inorganic oxide will be more specifically described hereinafter. More concretely, the catalyst in accordance with the present invention comprises (A) the catalytically active substance comprising iridium (A-a) and the above-mentioned element (A-b) coated with (B) the above-mentioned refractory inorganic compound.

This invention, owing to the coexistence of iridium (A) and at least one element selected from the group of elements (A-a) in the catalyst, represses the diffusion of iridium occurring in the catalyst under an elevated temperature and improves the catalyst in resistance to heat and durability, particularly under a high-temperature oxidizing atmosphere. Further, by coating the catalytically active component with a refractory inorganic compound selected from (B) the group, it is made possible to promote the stabilization of at least one element selected from the group of elements (A-b) and consequently to improve the catalyst in durability.

Preferably at least part of the iridium forms a composite oxide with at least one element selected from the group of elements (A-b).

The catalyst of this invention preferably contains a refractory inorganic oxide as the support material and more preferably incorporates this refractory inorganic oxide in a uniformly mixed state. By the use of the refractory inorganic oxide, the catalyst is improved in strength. Further, this refractory inorganic oxide functions effectively not only as the support material but also as a component for catalytic activity and promotes the improvement of the catalyst in the ability to expel the NOx.

In this invention, it is preferable to mix the catalytically active substance and the refractory inorganic oxide, to prepare the resultant mixture in the form of a slurry, and to deposit the slurry in the form of a coat on a refractory inorganic substrate, particularly a monolithic structure as a three-dimensional to form a layer and preferably to coat the layer with a refractory inorganic compound (B)—containing layer.

Incidentally, this invention is not restrained by the theoretical principle concerning the operating mechanism of the varying catalytically active substance mentioned above.

The content of iridium in the catalytic composition mentioned above contemplated by this invention is in the range of 0.1 to 20% by weight, preferably in the range of 0.5 to 15% by weight, and most preferably in the range of 1 to 10% by weight. If the content of iridium is less than 0.1% by weight, the shortage will be at a disadvantage in lowering the ratio of the NOx to be purified. Conversely, if the iridium content exceeds 20% by weight, the excess will be at a disadvantage in failing to bring a proportionate increase in the catalytic activity.

The source of iridium (A-a) does not need to be particularly restricted. Preferably, a water-soluble iridium salt may be used, for example. As typical examples of this iridium salt, iridium chloride, iridium bromide, iridium nitrate, iridium sulfate, and trichloroamine iridium, may be cited.

In the elements of Groups IIIA and IVA in the Periodic Table of the Elements, the elements of Group IVA are preferred over those of Group IIIA. Among other elements of Group IVA, germanium and/or tin proves to be most preferable. Germanium is preferred over tin. The iridium (A-a) mentioned above is preferred to form a composite oxide with at least one element selected from the group of elements (A-b). As typical examples of the composite oxide of iridium, $Ge_5Ir_4O_{13}$, $Ge_5Ir_4O_{11}$, $GeIrO_3$, $Sn_4Ir_3O_{10}$, and $Sn_xIrO_4$ may be cited.

The raw material for at least one element selected from the group of elements (A-b) mentioned above does not need to be particularly restricted. As typical examples of the raw material, nitrates, acetates, chlorides, bromides, sulfates, oxides, peroxides, and hydroxides may be cited.

As typical examples of the method for adding at least one element selected from the group of elements (A-b) mentioned above, ① a method which comprises adding at least one element selected from the group of elements (A-b) to a refractory inorganic oxide, drying the resultant mixture, and calcining the dried mixture, ② a method which comprises impregnating a refractory inorganic oxide with the solution of an organic solvent-soluble and/or water-soluble compound containing at least one element selected from the group elements (A-b), drying the impregnated refractory inorganic oxide, and calcining the dried inorganic oxide, ③ a method which comprises impregnating a refractory inorganic oxide with a homogeneous solution of an organic solvent-soluble and/or water-soluble compound containing at least one element selected from the group of elements (A-b) and a iridium salt, drying the impregnated refractory inorganic oxide, and calcining the dried inorganic oxide, ④ a method which comprises mixing an insoluble or sparingly soluble compound containing at least one element selected from the group of elements (A-b), a compound containing iridium, and a refractory inorganic oxide, and putting the resultant mixture to use, and ⑤ a method which comprises impregnating a refractory inorganic oxide with a homogenous mixed solution comprising the solution of an organic solvent-soluble and/or water-soluble compound containing at least one element selected from the group of elements (A-b) and an iridium salt, drying the resultant impregnated refractory inorganic oxide, and calcining the dried inorganic oxide may be cited.

A molar ratio of the elements (A-b) to iridium, [(A-b)/Ir], is preferably in the range of 1:5 to 200:1, more preferably in the range of 1:3 to 100:1, and most preferably in the range of 1:1 to 10:1. If the ratio of the elements (A-b) is smaller than 1:5, the shortage will lower the resistance to heat and the durability of the catalyst in a high-temperature oxidizing atmosphere. If the ratio of the elements (A-b) exceeds 200:1, the excess will not allow the produced catalyst to manifest a proportional increase in the effect aimed at.

The catalytically active substance (A) is coated with at least one refractory inorganic compound (B) selected from among alumina, titania, zirconia, and silica, composite oxides thereof such as, for example, alumina-titania, alumina-zirconia, silica-alumina, and zeolite, and barium sulfate. Among other compounds enumerated above, zeolite and/or barium sulfate proves to be particularly favorable.

As typical examples of the method for coating the catalytically active substance (A) with the refractory inorganic compound (B), ① a method which comprises immersing a catalytically active substance formed in a prescribed shape such as, for example, the spheres or cylinders, in the aqueous slurry containing the refractory inorganic compounds (B), drying the wetted catalytically active substance, and calcining the dried active substance and ② a method which comprises immersing a substrate having deposited thereon a catalytically active substance in the aqueous slurry comprising the refractory inorganic compounds (B), drying the wet substrate, and calcining the dried substrate may be cited.

The molar ratio of the refractory inorganic compound (B) to iridium, [the compound (B)/Ir], is preferably in the range of 10:1 to 200:1, more preferably in the range of 20:1 to 100:1, and most preferably in the range of 30:1 to 50:1. If the ratio of the elements (B) is smaller than 10:1, the shortage will lower the resistance to heat and the durability in a high-temperature oxidizing atmosphere. If the ratio of the elements (B) exceeds 200:1, the excess will lower the resistance to heat and the durability in a high-temperature oxidizing atmosphere instead of bringing a proportional increase in the effect.

The catalyst of this invention is preferred to contain a refractory inorganic oxide. As typical examples of the refractory inorganic oxide, refractory inorganic oxides such as, for example, alumina, titania, zirconia, and silica and composite oxides thereof such as, for example, alumina-titania, alumina-zirconia, and silica-alumina may be cited. These refractory inorganic oxides maybe used either singly or in the form of a mixture of two or more members. Among other refractory inorganic oxides enumerated above, the oxides of the elements of the aluminum group prove to be particularly favorable. It is more preferable to use α-alumina. The oxides of the elements of the aluminum group have BET (Brunauer-Emmett-Teller) surface areas preferably not exceeding 50 $m^2/g$ and more preferably falling in the range of 0.1 to 30 $m^2/g$. These refractory inorganic oxides are generally in a powdery form and have average particle diameters generally in the range of 0.1 to 50 μm. Such a refractory inorganic oxide accounts for a proportion preferably in the range of 1 to 300 g, more preferably in the range of 1 to 100 g, and most preferably in the range of 1 to 50 g per g of the catalytically active substance mentioned above.

The method for mixing a compound containing iridium (hereinafter referred to as "compound A-a"), a compound containing at least one element selected from the group of elements (A-b) (hereinafter referred to as "compound A-b"), and a refractory inorganic oxide does not need to be particularly restricted. As typical examples of this method, (a) a method which comprises mixing compound A-a, and compound A-b, drying the resultant mixture, calcining the dried mixture thereby obtaining a composite oxide, and mixing the composite oxide with the refractory inorganic oxide, (b) a method which comprises impregnating a refractory inorganic oxide with a homogeneous mixed aqueous solution of compound A-a and compound A-b, drying the wet refractory inorganic oxide, and calcining the dried inorganic oxide, (c) a method which comprises impregnating a refractory inorganic oxide with an aqueous solution of compound A-b, drying the wet refractory inorganic oxide, calcining the dried inorganic oxide, impregnating the calcined inorganic oxide with a homogeneous aqueous solution of compound A-b, drying the wet refractory inorganic oxide, and calcining the dried inorganic oxide, and (d) a method which comprises impregnating a refractory inorganic oxide with a homogeneous aqueous solution of compound A-b, drying and calcining the impregnated inorganic oxide, impregnating the calcined inorganic oxide with an aqueous solution of compound A-a, and drying and calcining the impregnated inorganic oxide may be cited.

To show the specific mode of producing the catalyst for use in this invention, ① a method which comprises forming a composition of any of the catalytically active substances (a) to (d) or a catalytic composition obtained by further incorporating with a refractory inorganic oxide in a prescribed shape such as, for example, spheres or cylinders and, for the purpose of coating the spheres or cylinders with the refractory inorganic compounds (B), immersing the spheres or cylinders in an aqueous slurry containing at least one compound selected from the group of compounds (B), drying the wet spheres or cylinders, and calcining the dried spheres or cylinder prior to use and ② a method which comprises depositing a composition of any of the catalytically active substances (a) to (d) mentioned above or a catalytic composition by further incorporating with a refractory inorganic oxide on a substrate and, for the purpose of coating the product of deposition with at least one compound selected from among the refractory inorganic compounds (B), immersing the product of deposition in an aqueous slurry containing at least one compound selected from the group of compounds (B), drying the wet product of deposition, and calcining the dried product of deposition prior to use may be cited.

As the substrate mentioned above, any of the refractory inorganic substrates formed in various shapes such as spheres, pellets, and monolithic structures and generally used for catalysts of the class under discussion may be adopted. Among other conceivable three-dimensional structures, the monolithic structures are advantageously used. As typical examples of the monolithic structures, a honeycomb monolithic substrate, a foamed substrate, and a corrugated substrate may be cited.

The monolithic substrate has only to be what is generally called a "ceramic honeycomb substrate." Particularly the honeycomb substrates which use cordierite, mullite, α-alumina, zirconia, titania, titanium phosphate, aluminum titanate, petalite, spodumene, aluminosilicate, and magnesium silicate as materials prove to be advantageous. Among other honeycomb substrates, the honeycomb substrate made of cordierite prove particularly advantageous. The substrates formed in monolithic structures with such antioxidant heat-resistant metals as the stainless steel and Fe—Cr—Al alloys are also available.

Such monolithic substrates are produced by a method of extrusion molding or a method which comprises winding a sheetlike element into a tight roll, for example. The shape of the apertures of the gas passages in the monolithic substrate (the shape of cells) may be a hexagon, a tetragon, a triangle, or a corrugation, whichever may fit the occasion best. The cell density (the number of cells/unit cross section) is satisfactorily in the range of 150 to 900 cells/square inch and preferably in the range of 400 to 600 cells/square inch.

Now, the method for preparing the catalyst contemplated by this invention will be described below.

(1) In the case of using the composition itself of any of the catalytically active substances (a) to (d) as a catalyst, (i) a method which comprises thoroughly stirring a composition of any of the catalytically active substances (a) to (d), then forming the resultant mass in the shape of cylinders or spheres, and coating the formed particles with a refractory inorganic compound (B) to prepare the catalyst.

(2) In the case of using a substrate, preferably a monolithic structure as a three-dimensional structure (hereinafter referred to as "monolithic structure"), (i) a method which comprises placing the catalytically active substances (a) to (d) collectively as in a ball mill, wet pulverizing them till an aqueous slurry is formed, immersing the monolithic structure in the aqueous slurry, drying and calcining the wet monolithic structure, and thereafter coating the calcined monolithic structure with a refractory inorganic compound (B), (ii) a method which comprises wet pulverizing a refractory inorganic oxide in a ball mill till an aqueous slurry is formed, immersing the monolithic structure in the aqueous slurry, drying and calcining the wet monolithic structure, then immersing the coated monolithic structure in the aqueous solution of a compound containing iridium and an element (A-b), drying and calcining the wet monolithic structure, and thereafter coating the monolithic structure with a refractory inorganic compound (B), (iii) a method which comprises mixing an iridium-containing compound, a compound containing an element (A-b), and a refractory inorganic oxide, wet pulverizing the produced mixture in a ball mill till an aqueous slurry is formed, immersing the monolithic structure in the aqueous slurry, drying and calcining the wet monolithic structure, and thereafter coating the monolithic structure with a refractory inorganic compound (B), (iv) a method which comprises impregnating a refractory inorganic oxide in the aqueous solution of a compound containing iridium, drying and calcining the wet inorganic oxide till a powder is obtained, then mixing the resultant powder with a compound containing an element (A-b), wet pulverizing the produced mixture in a ball mill till an aqueous slurry is formed, immersing the monolithic structure in the aqueous slurry, drying and calcining the wet monolithic structure, and thereafter coating the calcined monolithic structure with a refractory inorganic compound (B), and (v) a method which comprises impregnating a refractory inorganic oxide with the aqueous solution of a compound containing an element (A-b), drying and calcining the impregnated inorganic oxide till a powder is formed, then mixing the produced powder with a compound containing iridium, wet pulverizing the resultant mixture in a ball mill till an aqueous slurry is formed, immersing the monolithic structure in the aqueous slurry, drying and calcining the wet monolithic structure, and thereafter coating the calcined monolithic structure with a refractory inorganic compound (B) may be cited.

Among other methods cited above, the methods of (i) to (v) of Paragraph (2) prove to be particularly advantageous as from the standpoint of the stability of catalytic activity.

When a composition of any of the catalytically active substances (a) to (d) or a catalytic composition formed by incorporating the composition with a refractory inorganic oxide is deposited in the form of a coat on the monolithic structure, an amount of the catalytic composition to form the coat is preferably in the range of 50 to 500 g per liter of the monolithic structure and particularly preferably in the range of 100 to 300 g. If this amount falls short of 50 g, the shortage will bring a decrease in the catalytic activity. Conversely, if the amount exceeds 500 g, the excess will fail to give a proportional addition to the catalytic activity. Further, the amount of the refractory inorganic oxide (B) which is a compound for coating the monolithic structure having the catalytic composition deposited thereon is preferably in the range of 20 to 300 g per liter of the monolithic structure, particularly preferably in the range of 50 to 200 g. If this amount is less than 20 g, the shortage will lower the resistance to heat and the durability of the produced catalyst in a high-temperature oxidizing atmosphere. Conversely, if the amount exceeds 300 g, the excess will fail to give a proportional increase in the effect aimed at and lower the catalytic activity.

The atmosphere for calcination of the catalyst may be properly selected from among air, vacuum, the currents Of such inert gases as nitrogen and the currents of such reducing gases as hydrogen and carbon monoxide so as to suit the particular method adopted for the preparation of the catalyst. The calcination with a reducing gas proves particularly favorable. The calcination temperature is preferably in the range of 200° to 800° C. and more preferably in the range of 300° to 600° C. Then, the duration of the calcination is preferably in the range of 30 minutes to 20 hours and more preferably in the range of 1 hour to 5 hours.

The space velocity of the exhaust gas which occurs when the catalyst for purifying NOx of this invention is used is preferably in the range of 5,000 to 200,000 $hr^{-1}$. If the space velocity of the gas is less than 5,000 $hr^{-1}$, the shortage will enlarge the necessary catalyst volume so much as to render the catalysis uneconomical. Conversely, if this space velocity exceeds $200,000^{-1}$, the excess will lower the ratio of the expulsion of the NOx. The range of temperature of the exhaust gas which occurs when the catalyst for purifying NOx of this invention is used is preferably in the range of 200° to 700° C. and more preferably in the range of 250° to 600° C. as measured at the entrance to the catalyst bed. If this temperature is less than 200° C. or exceeds 700° C., the deviation will degrade the ability of the catalyst to purifying the NOx below the target level.

Then, the second mode of embodiment of this invention will be described in detail below.

The catalyst for purifying NOx of this invention contains as catalytically active substances for purifying the Nox, (A) iridium (A-a), at least one element selected from the group consisting of the elements of Groups IIIA and IVA in the Periodic Table of the Elements (A-b) and (C) at least one element selected from the group consisting of elements of Group IIIB in the Periodic Table of the Elements. The catalytically active substance mentioned above is preferred to contain a refractory inorganic oxide. In a preferred embodiment of this invention, therefore, a catalytic composition containing the catalytically active substances (A) and the element (C) and the refractory inorganic oxide is used. The refractory inorganic oxide will be described more specifically hereinafter.

This invention, owing to the coexistence of iridium (A-a) and the elements (A-b), is enabled to repress the diffusion of iridium which would occur under a high temperature and improve the catalyst in resistance to heat and durability, particularly under a high-temperature oxidizing atmosphere. Further, owing to the additional existence of the elements (C), this invention is enabled to promote the stabilization of the elements (A-b) and consequently improve the catalyst in durability while the vehicle carrying the catalyst is in the course of travel.

The content of iridium in the catalyst contemplated by this invention based on the amount of the refractory inorganic oxide is the same as in the case of the first mode of embodiment.

The source of iridium (A-a) which does not need to be particularly restricted is the same as in the case of the first mode of embodiment.

The elements of Group IIIA and IVA in the Periodic Table of the Elements (A-b) are the same as in the firs mode of embodiment. The iridium (A-a) mentioned above is also the same as in the case of the first mode of embodiment.

The raw material for the elements (A-b) mentioned above, which does not need to be particularly restricted, is the same as in the case of the first mode of embodiment.

The method for the addition of the elements (A-b) is the same as in the case of the first mode of embodiment.

The ratio of the elements (A-b) to iridium, [(A-b)/Ir], is also the same as in the case of the first mode of embodiment.

As the elements (C), any of yttrium and the elements of the lanthanide series proves to be preferable, further yttrium and/or cerium proves to be more preferable, and yttrium proves to be most preferable.

Though the raw material for the elements (C) does not need to be particularly restricted, nitrates, acetates, chlorides, sulfates, oxides, peroxides, and hydroxides, for example, may be used. Among other raw materials enumerated above, the compounds containing yttrium and/or cerium prove to be preferable and the compounds containing yttrium prove to be more preferable.

As typical examples of the method for adding the elements (C), ① a method which comprises adding the elements (C) to a refractory inorganic oxide and drying and calcining the resultant mixture, ② a method which comprises immersing a refractory inorganic oxide in the solution of an organic solvent-soluble and/or water-soluble compound containing the elements (C) and drying and calcining the wet refractory inorganic oxide, ③ a method which comprises impregnating a refractory inorganic oxide with a homogeneous solution of an organic solvent-soluble and/or water-soluble compound containing the elements (C) and a compound containing iridium and drying and calcining the wet refractory inorganic oxide, ④ a method which comprises mixing an insoluble or sparingly soluble compound containing the elements (C), a compound containing iridium, and a refractory inorganic oxide prior to use, and ⑤ a method which comprises impregnating a refractory inorganic oxide with a homogeneous mixed solution of an organic solvent-soluble and/or water-soluble compound containing the elements (C) and an iridium salt and drying and calcining the wet refractory inorganic oxide may be cited.

The molar ratio of the elements (C) to iridium, [(C)/Ir], is preferably in the range of 1:10 to 10:1, more preferably in the range of 1:5 to 10:1, and most preferably in the range of 1:1 to 5:1. If the ratio of the elements (C) is smaller than 1:10, the shortage will lower the resistance to heat and the durability of the catalyst in a high-temperature oxidizing atmosphere. If the elements (C) is used in a ratio exceeding 10:1, the excess will fail to bring a proportionate increase in the effect aimed at and lower the resistance to heat and the durability of the catalyst in a high-temperature oxidizing atmosphere.

The catalyst of this invention preferably contains a refractory inorganic oxide as a support material and more preferably incorporates this refractory inorganic oxide in a homogeneously mixed state. The use of the refractory inorganic oxide improves the catalyst in strength. Further, this refractory inorganic oxide serves effectively not only as a support material but also as a catalytically active component and promotes the improvement of the ability of the catalyst to purify the NOx. The typical examples of the refractory inorganic oxides are the same as in the case of the first mode of embodiment.

The method for mixing a compound containing iridium (hereinafter referred to as "compound A-a"), a compound containing the elements (A-b) (hereinafter referred to as "compound A-b"), and a compound containing at least one element selected from the group of elements (C) (hereinafter referred to as "compound C") with a refractory inorganic oxide does not need to be particularly restricted. For example, (e) a method which comprises mixing a compound A-a, a compound A-b and a compound C, drying and calcining the mixture to obtain a composite oxide and mixing the composite oxide with a refractory inorganic oxide, (f) a method which comprises impregnating a homogeneous aqueous solution of the compound A-a, the compound A-b and the compound C into the refractory inorganic oxide and drying and calcining the wet refractory inorganic compound, (g) a method which comprises impregnating an aqueous solution of the compound A-a into the refractory inorganic oxide, drying and calcining and then impregnating an aqueous solution of the compound A-b, drying and calcining, and then impregnating an aqueous solution of the compound C into the refractory inorganic oxide and drying and calcining, (h) a method which comprises impregnating a homogeneous aqueous solution of the compound A-a and the compound A-b into a refractory inorganic oxide, and drying and calcining, impregnating an aqueous solution of the compound C into the refractory inorganic oxide, and drying and calcining, and (i) a method which comprises impregnating an aqueous solution of the compound A-b into the refractory inorganic oxide, drying and calcining, impregnating a homogeneous aqueous solution of the compound A-a and the compound C into the refractory inorganic oxide, and drying and calcining may be cited. By the above-mentioned methods of (e) to (i) or combination thereof, a catalyst composition comprising the catalytically active substance and the refractory inorganic oxide can be obtained.

As typical examples of the specific mode of using the catalyst in this invention, ① a method which comprises forming a composition of any of the catalyst compositions (e) to (i) or a catalyst composition incorporating therein a refractory inorganic oxide in a prescribed shape such as, for example, spheres or cylinders prior to use and ② a method which comprises depositing a composition of any of the catalyst composition (e) to (i) or acatalyst composition on a refractory inorganic substrate may be cited.

The substrate mentioned above is the same as in the case of the first mode of embodiment.

Now, the method for preparing the catalyst according to this invention will be described below.

(1) In the case of using no substrate of any of the catalytically active substances (e) to (h) by itself as a catalyst, a method which comprises, thoroughly stirring a catalyst composition obtained by any method of (e) to (h) to prepare the catalyst may be cited.

(2) In the case of using a substrate, preferably a monolithic structure as a three-dimensional structure (hereinafter referred to simply as "monolithic structure"), (i) a method which comprises placing the catalyst composition obtained by any methods of (e) to (h) collectively in a ball mill, wet pulverizing them till an aqueous slurry is formed, immersing the monolithic structure, and drying and calcining the wet monolithic structure, (ii) a method which comprises wet pulverizing a refractory inorganic oxide in a ball mill till an aqueous slurry is formed, immersing the monolygthic structure in the aqueous slurry, drying and calcining the wet monolithic structure, then immersing the monolithic structure coated with the refractory inorganic oxide in the aqueous solution of a compound containing iridium, a compound containing the element (A-b), and a compound containing the element (C), and drying and calcining the wet monolithic structure, (iii) a method which comprises mixing a compound containing iridium, a compound containing the element (A-b), a compound containing the element (C), and a refractory inorganic oxide, then wet pulverizing the mixture in a ball mill till an aqueous slurry is formed, immersing a monolithic structure in the aqueous slurry, and drying and calcining the wet monolithic structure, (iv) a method which comprises impregnating a refractory inorganic oxide with the aqueous solution of a compound containing iridium and a compound containing the element (A-b), drying and calcining the wet refractory inorganic oxide thereby obtaining a powder, then mixing the resultant powder and a compound containing the element (C), wet pulverizing the produced mixture in a ball mill till an aqueous slurry is formed, immersing the monolithic structure in the aqueous slurry, and drying and calcining the wet monolithic structure, (v) a method which comprises impregnating a refractory inorganic oxide with the aqueous solution of a compound containing iridium and a compound containing the element (C), drying and calcining the wet refractory inorganic oxide thereby obtaining a powder, mixing the resultant powder and a compound containing the element (A-b), wet pulverizing the produced mixture in a ball mill till an aqueous slurry is formed, immersing the monolithic structure in the aqueous slurry, and drying and calcining the wet monolithic structure, and (vi) a method which comprises impregnating a refractory inorganic oxide with the aqueous solution of a compound containing the element (A-b) and a compound containing the element (C), drying and calcining the wet inorganic oxide hereby obtaining a powder, then mixing the resultant mixture with a compound containing iridium, wet pulverizing the produced mixture in a ball mill till an aqueous slurry is formed, immersing the monolithic structure in the aqueous slurry, and drying and calcining the wet monolithic structure may be cited.

Among other methods enumerated above, the methods of (i) to (vi) in (2) prove to be particularly favorable from the standpoint of the stability of the catalytic activity.

Then, in the case of depositing a composition of any of the catalyst compositions (e) to (h) or a catalyst composition obtained by further incorporating additionally therein a refractory inorganic oxide in the form of a coat on the monolithic structure, the amount of the catalytic composition to be used for the coating is preferably in the range of 50 to 400 g, particularly preferably in the range of 100 to 300 g, per liter of the monolithic structure. If this amount is less than50 g, the shortage will bring a decrease in the catalytic activity. Conversely, if the amount exceeds 400 g, the excess will fail to give a proportionate increase in the catalytic activity.

The calcination atmosphere of the catalyst is the same as in the case of the first mode of embodiment.

The space velocity of the exhaust gas and the temperature of the exhaust gas which occur when the catalyst for purifying NOx of this invention is used are the same as in the case of the first mode of embodiment.

In the method of treatment for exhaust gas using the catalyst in accordance with the present invention, it is preferable to fit the engine operated under an air-fuel ratio A/F is not less than 16, more preferably not less than 20 wherein the exhaust gas is in an oxygen-excess atmosphere. Further, when the exhaust gas becomes a high temperature during high speed traveling, it is preferably used for the engine which is driven wherein supply of the fuel decreases occasionally for decreasing the speed and the exhaust gas becomes a high-temperature oxidizing atmosphere. Concretely the catalyst of this invention is used in the condition that is available for purging the exhaust gas emanating from a various internal combustion engine such as the diesel engine, lean-burn engine, or gasoline cylinder direct-injection engine which, depending on the condition of travel of the vehicle carrying the engine, entails conversion of the exhaust gas into an oxygen-excess atmosphere or a high-temperature oxidizing atmosphere and consequent expansion of the range of change in temperature of the exhaust gas.

The various working examples of the catalyst for purifying NOx of this invention will be described below with reference to their methods of production.

EXAMPLE 1

First, 100 g of a commercially available powdery α-alumina having a BET surface area of 2 $m^2$ as a support material and an aqueous iridium chloride solution containing 5 g of iridium were mixed. Then, the resultant mixture was dried at 120° C. for 2 hours and then calcined at 600° C. for 2 hours in an atmosphere containing 2% of hydrogen till a powdery catalyst formed of α-alumina containing fine particles of iridium (hereinafter referred to as "catalyst component (a)").

Thereafter, the catalyst component (a) and 19.6 g of powdery tin oxide ($SnO_2$) were wet pulverized in a ball mill till an aqueous slurry was obtained. Subsequently, commercially available honeycomb substrate of cordierite (made by Nippon Gaishi Co., Ltd., furnished in the cross section with 400 gas flow cells per square inch, and measuring 33 mm in diameter, 76 mm in length, and 65 ml in volume) was immersed in the aqueous slurry. Thereafter, the wet honeycomb substrate was blown with compressed air to expel the excess slurry and dried at 120° C. for 2 hours.

Further, 50 g of powdery barium sulfate ($BaSO_4$) was wet pulverized in a ball mill till an aqueous slurry was obtained. Then, the honeycomb substrate having the catalytically active component deposited thereon was immersed in the aqueous slurry. The produced wet substrate was blown with compressed air to expel the excess aqueous slurry, dried at 120° C. for 2 hours and further calcined at 500° C. for 1 hour in an atmosphere of air to obtain a complete catalyst (A). This complete catalyst (A) contained 5% by weight of iridium, 15.4% by weight of tin, and 50% by weight of barium sulfate based on the amount of α-alumina.

EXAMPLE 2

A complete catalyst (B) was obtained by following the procedure of Example 1 while using 13.6 g of powdery germanium oxide ($GeO_2$) in the place of 19.6 g of powdery tin oxide. This complete catalyst (B) contained 5% by weight of iridium, 9.4% by weight of germanium, and 50% by weight of barium sulfate based on the amount α-alumina.

EXAMPLE 3

A complete catalyst (C) was obtained by following the procedure of Example 2 while using 50 g of a commercially available ZSM-5 type zeolite ($SiO_2/Al_2O_3$=40) in the place of 50 g of barium sulfate. This complete catalyst (C) contained 5% by weight of iridium, 9.4% by weight of germanium and 50% by weight of ZSM-5 type zeolite based on the amount α-alumina.

EXAMPLE 4

A complete catalyst (D) was obtained by following the procedure of Example 2 while using 50 g of commercially available γ-alumina in the place of 50 g of barium sulfate. This complete catalyst (D) contained 5% by weight of iridium, 9.4% by weight of germanium, and 50% by weight of γ-alumina based on the amount of α-alumina.

Then, the control catalysts corresponding to the catalysts (A) to (D) mentioned above will be described below with reference to their methods of production.

Control 1

A control catalyst (V) was obtained by following the procedure of Example 1 while omitting the coating with barium sulfate. This control catalyst (V) contained 5% by weight of iridium and 15.4% by weight of tin based on the amount of α-alumina.

Control 2

A control catalyst (W) was obtained by following the procedure of Example 1 while omitting the addition of powdery tin oxide. This control catalyst (W) contained 5% by weight of iridium and 50% by weight of barium sulfate based on the amount of α-alumina.

Control 3

A mixture of 100 g of a commercially available ZSM-5 type zeolite ($SiO_2/Al_2O_3$=40) with 400 g of purified water was stirred at 98° C. for 2 hours. To this mixture, 600 ml of an aqueous 0.2 mol/l copper ammine complex solution was slowly added dropwise at 80° C. Then, the zeolite incorporating copper ammine complex was separated from the mixture by filtration, thoroughly washed, and then dried at 120° C. for 24 hours till a zeolite catalyst powder was obtained. This powder was wet pulverized in a ball mill till an aqueous slurry was obtained. Then, a control catalyst (X) was obtained using the aqueous slurry mentioned above by following the procedure of Example 1. This control catalyst (X) contained 5.6% by weight of copper based on the amount of zeolite.

EXAMPLE 5

An aqueous slurry was obtained by wet pulverizing the catalyst component (a), 19.6 g of powdery tin oxide ($SnO_2$), and 5 g of powdery yttrium oxide ($Y_2O_3$) in a ball mill. Subsequently, commercially available honeycomb substrate of cordierite (made by Nippon Gaishi Co., Ltd., furnished in the cross section with 400 gas flow cells per square inch, and measuring 33 mm in diameter, 76 mm in length, and 65 ml in volume) was immersed in the aqueous slurry. The wet honeycomb substrate was brown with compressed air to expel the excess aqueous slurry and then dried at 120° C. for 2 hours to obtain a complete catalyst (E). This complete catalyst (E) contained 5% by weight of iridium, 15.4% by weight of tin, and 3.9% by weight of yttrium based on the amount of α-alumina.

EXAMPLE 6

A complete catalyst (F) was obtained by following the procedure of Example 5 while using 7.6 g of powdery cerium oxide($CeO_2$)in the place of 5 g of yttriumoxide. This complete catalyst (F) contained 5% by weight of iridium, 15.4% by weight of tin, and 6.2% by weight of cerium based on the amount of α-alumina.

EXAMPLE 7

A complete catalyst (G) was obtained by following the procedure of Example 5 while using 7.2 g of powdery lanthanum oxide ($La_2O_3$) in the place of 5 g of yttrium oxide. This complete catalyst (G) contained 5% by weight of iridium, 15.4% by weight of tin, and 6.1% by weight of lanthanum based on the amount of α-aluminum.

EXAMPLE 8

A complete catalyst (H) was obtained by following the procedure of Example 5 while using 7.5 g of powdery praseodymium oxide ($Pr_6O_{11}$) in the place of 5 g of yttrium oxide. This complete catalyst (H) contained 5% by weight of iridium, 15.4% by weight of tin, and 6.2% by weight of praseodymium based on the amount of α-alumina.

EXAMPLE 9

A complete catalyst (I) was obtained by following the procedure of Example 5 while using 13.6 g of powdery germanium oxide ($GeO_2$) in the place of 19.6 g of powdery tin oxide. This complete catalyst (I) contained 5% by weight of iridium, 9.4% by weight of germanium, and 3.9% by weight of yttrium based on the amount of α-alumina.

Control 4

A control catalyst (Y) was obtained by following the procedure of Example 5 while omitting the addition of the powdery tin oxide. This control catalyst (Y) contained 5% by weight of iridium and 3.9% by weight of yttrium based on the amount of α-alumina.

Control 5

A control catalyst (Z) was obtained by following the procedure of Example 5 while omitting the addition of the powdery yttrium oxide. This control catalyst (Z) contained 5% by weight of iridium and 15.4% by weight of tin based on the amount of α-alumina.

Then, the catalysts (A) to (I) and (V) to (Z) prepared in Examples 1 to 9 and Controls 1 to 5 were evaluated for catalytic activity using a model gas (A/F=27) imitating the exhaust gas emanating from a lean-burn engine and destined to form an oxygen-excess atmosphere.

(Method of Evaluation)

Stainless reaction tubes measuring 34.5 mm in diameter and 300 mm in length were filled severally with the catalysts mentioned above. The reaction gas of the following composition was introduced severally into the reaction tubes at a space velocity of 50,000 $hr^{-1}$ and the inlet temperature of the catalyst bed was continuously elevated to a level in the range of 150 to 500° C. Under these conditions, the catalysts were tested for ratio of expulsion of the NOx by way of evaluating the performance of catalyst.

| (Composition of reaction gas) | |
| --- | --- |
| Nitrogen monoxide (NO) | 600 ppm |
| Propylene ($C_3H_6$) | 5000 ppm (as reduced to methane) |
| Carbon monoxide (CO) | 0.24% by volume |
| Hydrogen ($H_2$) | 800 ppm |
| Steam ($H_2O$) | 10% by volume |
| Carbon dioxide ($CO_2$) | 7% by volume |
| Oxygen ($O_2$) | 12% by volume |
| Nitrogen ($N_2$) | Balance |

As the results of the evaluation of the catalysts, the highest ratios of NOx expulsion and the relevant catalyst inlet temperatures are shown in Table 1.

The catalysts (A) to (I) and (V) to (Z) prepared in Examples 1 to 9 and Controls 1 to 5, for the purpose of being tested for durability and resistance to heat, were evaluated for performance after the following test for durability. First, the catalysts were packed severally in multiconverters to form packed catalyst beds. The exhaust gas emanating from a commercially available gasoline lean-burn engine was adjusted to an air-fuel ratio (A/F) of 27 and passed through the packed catalyst beds at a space velocity (S.V.) 160,000 $hr^{-1}$ to age the catalyst beds for 20 hours under the condition of a catalyst bed temperature of 800° C. (Aged-1). Thereafter, the packed catalyst beds were evaluated for performance by the method of evaluation mentioned above. The results of the evaluation are shown additionally in Table 1.

TABLE 1

| | | Maximum ratio of $NO_x$ purification (%)/catalyst inlet temperature (° C.) | | |
| --- | --- | --- | --- | --- |
| | Catalyst | Fresh | Aged-1 | Aged-2 |
| Example 1 | A | 55/352 | 49/380 | 43/381 |
| Example 2 | B | 51/351 | 46/365 | 42/367 |
| Example 3 | C | 58/351 | 51/365 | 46/368 |
| Example 4 | D | 53/350 | 45/363 | 29/363 |
| Control 1 | V | 50/352 | 42/385 | 0 |
| Control 2 | W | 52/356 | 41/470 | 5/380 |
| Control 3 | X | 61/350 | 31/400 | 0 |
| Example 5 | E | 66/352 | 50/380 | 45/381 |
| Example 6 | F | 64/351 | 51/365 | 42/367 |
| Example 7 | G | 65/351 | 51/365 | 31/368 |
| Example 8 | H | 63/350 | 53/363 | 32/363 |
| Example 9 | I | 66/350 | 58/361 | 50/362 |
| Control 4 | Y | 60/352 | 46/385 | 0 |
| Control 5 | Z | 63/356 | 44/470 | 5/380 |

Further, the catalysts (A) to (I) and (V) to (Z) prepared in Examples 1 to 9 and Controls 1 to 5, for the purpose of being tested for resistance to heat and durability in a high-temperature oxidizing atmosphere, were evaluated for performance after the following test for durability.

A commercially available gasoline engine was operated through repeated cycles each comprising the steps of ① 60 seconds' cruising at A/F=14.7 (stoichiometric atmosphere), ② 10 seconds' suspension of the supply of fuel (high temperature oxidative atmosphere), ③ 10 seconds' operation at A/F=13.0 (oxygen-defective atmosphere), and ④ return to the stoichiometric atmosphere, for the purpose of intentionally producing a state of accelerating and decelerating the speed during the course of a high-speed travel Then, the catalysts were severally packed in multiconverters to form relevant packed catalyst beds. The exhaust gas from the engine in operation was passed through the packed catalyst beds to age the catalysts for 20 hours under the conditions of a space velocity (S.V.) of 160,000 $hr^{-1}$ and a catalyst bed temperature of 800° C. (Aged-2). Thereafter, the packed catalyst beds mentioned above were evaluated for performance by the method of evaluation mentioned above. These results are shown in addition in Table 1.

It is clear from the results of Table 1 that the catalysts (A) to (I) of the working examples of this invention showed high levels of catalytic activity in the test for durability in both the phases of Aged-i and Aged-2 as compared with the catalysts (V), (W), (X), (Y), and (Z) of Control 1. This fact indicates that they possessed resistance to heat and durability. Particularly, the catalysts (A) to (C), (E), (F) and (I) showed virtually no sign of degradation of the catalytic activity in the test for durability in a high-temperature oxidizing atmosphere. This fact indicates that they excelled in resistance to heat and in durability.

The catalyst for purifying NOx of this invention thus excels the conventional catalyst in resistance to heat and in durability in a high temperature range, particularly under a high-temperature oxidizing atmosphere. Further, it excels in practicability because it can be easily produced without requiring any complicated process such as, for example, ion exchange.

INDUSTRIAL APPLICABILITY

The catalyst of this invention exhibits a high catalytic activity in a wide range of temperatures.

The catalyst of this invention effectively represses diffusion of iridium in a range of high temperatures and excels in resistance to heat and durability particularly under a high-temperature oxidizing atmosphere.

In the catalyst of this invention, the diffusion of iridium can be prevented more effectively owing to the coexistence of iridium (A-a) and elements (A-b) and, as a result, the resistance to heat and the durability are improved as well as the catalytic activity particularly under a high-temperature oxidizing atmosphere. Further, by coating this catalyst system with a refractory inorganic compound (B) selected from the group consisting of oxides represented by alumina, silica, titania, and zirconia, composite oxides thereof, zeolite, and barium sulfate, the stabilization of iridium (A-a)and elements (A-b) during the travel of a vehicle is promoted and, consequently, the durability of the catalyst is more improved. The catalyst of this invention preferably contains a refractory inorganic oxide and more preferably incorporates it in a uniformly mixed state. The refractory inorganic oxide improves the catalyst in strength, functions effectively not only as the support material but also as the component for catalytic activity, and promotes the improvement of the catalyst in the ability to purify the NOx.

Then, in the catalyst of this invention, owing to the coexistence of iridium (A-a) and the elements (A-b), the diffusion of iridium is prevented with enhanced effectiveness and, as a result, the catalyst is improved in not only catalytic activity but also resistance to heat and durability particularly under a high-temperature oxidizing atmosphere. Further, by adding the elements (C) to the catalyst system, it is made possible to stabilize the element (A-b) and, as a result, improve the catalyst further in resistance to heat and durability. The catalyst of this invention preferably contains the refractory inorganic oxide and more preferably incorporates it in a uniformly mixed state. The refractory inorganic oxide improves the catalyst in strength, functions effectively as not only the support material but also the component for catalytic activity, and promotes the improvement of the catalyst in the ability to purify the NOx.

The catalyst of this invention further excels in practicability because it can be easily prepared.

The catalyst of this invention, as described above, is at an advantage in being available for purging the exhaust gas emanating from a various internal combustion engine such as the diesel engine, lean-burn engine, or gasoline cylinder direct-injection engine which, depending on the condition of travel of the vehicle carrying the engine, entails conversion of the exhaust gas into an oxygen-excess atmosphere or a high-temperature oxidizing atmosphere and consequent expansion of the range of change in temperature of the exhaust gas.

The invention claimed is:

1. A catalyst for purifying nitrogen oxides formed by coating (A) a catalytically active substance comprising (A-a) iridium, (A-b) tin and a powdered refractory inorganic oxide with (B) an aqueous slurry of refractory inorganic compound.

2. The catalyst for purifying nitrogen oxides according to claim 1, wherein said catalyst is supported on a refractory inorganic substrate.

3. The catalyst for purifying nitrogen oxides according to claim 2, wherein said refractory inorganic substrate is coated with a layer which contains a catalytically active substance comprising iridium (A-a), tin (A-b), and said powdered refractory inorganic oxide, and said layer is coated with a layer which contains the refractory inorganic compound (B).

4. The catalyst for purifying nitrogen oxide according to claim 1, wherein said refractory inorganic compound (B) is at least one member selected from the group consisting of (B-a) a compound containing at least one member selected from the group consisting of aluminum, titanium, zirconium, and silicon, (B-b) a composite oxide thereof, (B-c) zeolite, and (B-d) barium sulfate.

5. The catalyst for purifying nitrogen oxides according to claim 1, wherein said refractory inorganic compound (B) is zeolite and/or barium sulfate.

6. The catalyst for purifying nitrogen oxides according to claim 1, wherein the molar ratio of tin (A-b) to iridium, [(A-b)/Ir], is in the range of 1:5 to 200:1 and the molar ratio of the refractory inorganic compound (B) to iridium, [(B)/Ir], is in the range of 10:1 to 100:1.

7. The catalyst for purifying nitrogen oxides according to claim 2, wherein the amount of said powdered refractory inorganic oxide is in the range of 1 to 300 g per g of the refractory inorganic substrate.

8. The catalyst for purifying nitrogen oxides according to claim 1, wherein the content of iridium is in the range of 0.1 to 20% by weight based on the amount of said powdered refractory inorganic oxide.

9. The catalyst for purifying nitrogen oxides according to claim 2, wherein said catalyst is deposited in an amount in the range of 50 to 500 g per liter of the refractory inorganic substrate.

* * * * *